United States Patent Office 3,529,935
Patented Sept. 22, 1970

3,529,935
CATALYTIC REACTION OF CARBON
MONOXIDE WITH STEAM
Ernst Lorenz, Friedrich Wodtcke, Franz Ludwig Ebenhoech, and Erich Giesler, Ludwigshafen (Rhine), and Helmut Kirner, Lambsheim, Germany, assignors to Badische Anilin- & Soda-Fabrik Aktiengesellschaft, Ludwigshafen (Rhine), Germany
No Drawing. Filed Apr. 10, 1968, Ser. No. 720,369
Claims priority, application Germany, Apr. 15, 1967, 1,667,386
Int. Cl. C01b 1/03
U.S. Cl. 23—213                                      6 Claims

ABSTRACT OF THE DISCLOSURE

The catalytic reaction of carbon monoxide with steam in the presence of oxidic or sulfidic catalysts containing the transition elements of Group VI of the Periodic System and cobalt and/or nickel on a carrier of aluminum oxide and magnesium oxide.

---

Catalysts based on iron, particularly those which contain activators, for example chromium, are in general used for the catalytic reaction of carbon monoxide with steam to form hydrogen and carbon dioxide (conversion).

It is also known that the sulfides of transition elements of the Group VI of the Periodic System and of cobalt and/or nickel on carriers containing aluminum oxide can be used as catalysts for the conversion process. These catalysts have an activity which is equal to, or even somewhat superior to, that of catalysts based on iron. Moreover, they have a number of properties, such as insensitivity to sulfur, hydrogenation activity and regenerability, which the catalysts based on iron do not have or have only to a limited extent and which are a considerable advantage for the conversion reaction.

When applied to carriers which contain oxides and silicates as well as hydraulic binders, these catalysts develop particularly high stability and mechanical strength, particularly in the presence of steam under pressure, for example even at steam pressures of more than 50 atmospheres.

We have now found that catalysts which contain oxides or sulfides or transition elements of Group VI of the Periodic System and cobalt and/or nickel and which have been applied to carriers containing aluminum oxide achieve a surprisingly high activity in the reaction of carbon monoxide with steam when a carrier is used which in addition to aluminum oxide contains magnesium oxide and/or zinc oxide.

The reason for the exceptional increase in the activity of catalysts in which the said carriers are used as compared with catalysts which contain alumina alone as carrier is not yet clear. It is probably due to the content of magnesium-aluminum and/or zinc-aluminum spinels which are formed when the catalyst is suitably prepared or under the conditions of the conversion. The addition of magnesium oxide and/or zinc oxide suppresses the formation of the blue cobalt-aluminum spinel $CoAl_2O_4$ or the greenish nickel-aluminum spinel $NiAl_2O_4$ which otherwise occurs in an alumina catalyst devoid of additives. The more or less blackish color of the catalysts according to this invention in the oxidic condition shows rather the presence of spinels of trivalent cobalt or nickel which probably form particularly active sulfides, possibly of the $Me_3S_4$ type, under the reaction conditions.

The effect of the carrier composition used according to the invention is anomalous because in other catalytic processes nothing like a comparable increase in activity as compared with aluminum oxide or magnesium oxide carriers is achieved with the same composition or other composition of the active components.

In the process according to the invention it is advantageous to use catalysts which contain at least 10% of aluminum oxide as well as at least 5% of magnesium oxide and/or zinc oxide or which under the reaction conditions, after more or less complete reaction of the aluminum oxide to spinels, contain 5 to 95%, preferably 15 to 85%, of magnesium-aluminum spinel and/or zinc-aluminum spinel.

Examples of advantageous combinations of catalytically active components of the catalysts are molybdenum and cobalt, molybdenum and nickel, tungsten and cobalt, and tungsten and nickel. The oxides or sulfides of the transition metals are preferably applied to the carrier in amounts of from 5 to 50% by weight with reference to the finished catalyst.

The catalysts have their maximum conversion activity in the sulfidic condition. The concentration of hydrogen sulfide and/or organic sulfur compounds in the gases to be converted does not affect the reaction and there is practically no upper limit to this concentration. Gases having a sulfur content of only 0.1% by volume and less may be converted without disadvantage. The catalysts may be converted into the sulfidic condition during manufacture or may be converted prior to the beginning of the conversion in the reactor, for example by treatment with gas containing hydrogen sulfide at elevated temperature.

The essential advantage of the process according to the invention consists in the fact that it makes the use of higher space velocities and consequently smaller reactors possible. Carbon monoxide conversions of 10,000 m.$^3$ (S.T.P.) per m.$^3$ of catalyst per hour or more can be achieved at a total pressure of for example 100 atmospheres. Instead of a higher space velocity, it is however possible to use lower reaction temperatures which may be advantageous for example in low temperature conversion for reasons of equilibrium or for example in the case of gases having very high carbon monoxide contents depending on the materials of construction. Having regard to the relationship between temperature and conversion equilibrium it is advantageous to use a method comprising two or more stages, the temperature in each successive stage being kept lower than in the preceding stage.

The process may be advantageously carried out at superatmospheric pressure, for example at 5 to 150 atmospheres. The mechanical strength of the catalysts used also increases considerably at a steam pressure of more than 50 atmospheres and at temperatures of more than 500° C. as compared with their strength immediately after manufacture. They undergo little or no change as regards their structure and internal surface area. Their activity therefore remains practically constant for long on-stream periods, for example for a year or more. The process is in general carried out at temperatures of from 180° to 550° C.

The catalysts have excellent hydrogenating properties and may be used with advantage for the conversion of crude gas which contains unsaturated compounds and causes polymer deposits in the presence of oxygen and oxides of nitrogen. Deposition of resinous or coke-like polymers on the catalyst is substantially avoided by hydrogenation of the unsaturated constituents of the gas. If, in spite of this, for example in the conversion of crude gases containing tar, deposition of the tar constituents on the catalyst results in a gradual decrease in activity, it is possible to roast the catalyst in situ with a mixture of air and inert gas or air and steam, whereupon its initial activity is restored.

The catalyst carrier may be prepared for example by common precipitation of the hydroxides of aluminum, magnesium and/or zinc from solutions of salts having an appropriate composition with an alkaline precipitant. Ammonia, caustic soda solution or sodium aluminate is suitable for example as an alkaline precipitant. Precipitation is carried out as a rule at a temperature of from 0° to 100° C. Hydroxides or active oxides of the individual components may however first be prepared separately and then kneaded together or finely ground. Solutions of the sulfates, nitrates and chlorides of aluminum, magnesium and zinc may be used as starting materials. Carbonates, acetates and formates of magnesium and zinc are also suitable for the preparation of the active oxides. The carriers are then impregnated with cobalt salt and/or nickel salt solutions and ammonium molybdate or ammonium tungstate solutions simultaneously or consecutively, kneaded and the water evaporated to such an extent that a plastic composition forms which can be molded into strands. The carrier impregnated with the metal salt solutions may however be heated at up to 500° C. for some hours and shaped into pellets or molded into strands after having been made into a paste with water. The catalyst is then predried first at room temperature and then at a temperature of about 120° C. and finally activated in a current of air at temperatures of from 400° to 600° C.

The strength of the new catalysts is good and increases under the conditions of pressure conversion to a mulitple of its original value. However, if the strength is not adequate in cases of extreme stress, it can be increased, even with a low spinel content, by adding a hydraulic binder, such as portland cement, high-alumina cement or calcium aluminate.

The invention is illustrated by the following examples.

EXAMPLE 1

A gas having the composition in percent by volume:

| | |
|---|---|
| CO | 40 |
| $H_2$ | 58 |
| $CO_2$ | 0.5 |
| $N_2+Ar$ | 1.4 |
| $H_2S$ | 0.1 | is converted under the operating conditions set out in Table 1 in continuous experimental equipment operating under adiabatic conditions in which the conversion reaction takes place in two successive reactors, each having a catalyst volume of 2.5 liters, with an intercooler, four different catalysts being used in comparative tests. Catalyst (A) is a commercial iron-chromium oxide catalyst in the form of grains having sizes of from 3 to 5 mm.; catalyst (B) is a catalyst having the following composition in percent by weight: $MoO_3$ 10%, CoO 4%, gamma-$Al_2O_3$ 66%, Secar cement 20% in the form of extruded pellets 4 mm. in length. Experiments (C) and (D) are carried out with catalysts according to this invention in the form of 3 mm. pellets or 4 mm. extruded strands whose preparation is described below. The results obtained in all four cases after an on-stream period of four hundred hours are set out in Table 1.

TABLE 1

| | Test | | | | | | | |
|---|---|---|---|---|---|---|---|---|
| | (A) | | (B) | | (C) | | (D) | |
| | Reactor | | | | | | | |
| | 1 | 2 | 1 | 2 | 1 | 2 | 1 | 2 |
| Pressure atmospheres gauge | 85 | 85 | 85 | 85 | 85 | 85 | 85 | 85 |
| Dry gas, vol./vol./hour | 1,500 | 1,500 | 1,500 | 1,500 | 3,000 | 3,000 | 3,000 | 3,000 |
| Wet gas, vol./vol./hour | 3,500 | 3,500 | 3,600 | 3,600 | 6,700 | 6,700 | 6,700 | 6,700 |
| Temperature, ° C.: | | | | | | | | |
| At entry | 335 | 355 | 320 | 320 | 320 | 320 | 295 | 295 |
| At exit | 470 | 360 | 440 | 325 | 435 | 325 | 420 | 300 |
| CO content in dry gas | 6.0 | 2.5 | 6.7 | 1.3 | 7.2 | 1.4 | 5.1 | 1.2 |
| CO conversion mole percent | 80.1 | 91.7 | 77.7 | 95.7 | 76 | 95.3 | 83.0 | 95.0 |

It will be seen from the table that for a throughput of makeup gas of 1,500 liters per liter of catalyst per hour, appreciably lower reaction temperatures are sufficient when using catalyst (B) to achieve about the same carbon monoxide conversion as with a commercial iron oxide-chromium oxide catalyst (A). With the catalysts according to the invention in experiments (C) and (D) it is even possible to double the amount of makeup gas to be converted at a reaction temperature which is the same as or even lower than that in experiments (A) and (B). At the same reactor inlet temperature as in test (B), the amount of makeup gas may even be increased with catalyst (D) to 3,500 to 4,000 liters per liter of catalyst per hour.

Production of catalyst (C): 885 g. of $Al_2(SO_4)_3 \cdot 18H_2O$ and 650 g. of $ZnSO_4 \cdot 7H_2O$ are dissolved in 4 liters of water, heated to 90° C. and precipitated with ammonia until the pH value is 6.8. The precipitate is suction filtered and washed with 1% aqueous $(NH_4)_2CO_3$ solution until free from sulfate. This carrier is kneaded with 49 g. of $Co(CO_3)_2 \cdot 6H_2O$ and 44 g. of ammonium molybdate $(NH_4)_6Mo_7O_{24} \cdot 4H_2O$, dried at 100° C., molded into 3 mm. pellets and calcined for sixteen hours at 600° C. The catalyst then has the following composition:

| | Percent |
|---|---|
| $Al_2O_3$ | 47 |
| ZnO | 38.7 |
| $MoO_3$ | 10 |
| CoO | 4 |
| $SO_4^{(=)}$ | 0.1 |
| $H_2O$ | 0.2 |

The bulk density is 1,050 g./liter.

Production of catalyst (D): 2,440 g. of finely divided ground caustic magnetite and 8,250 g. of boehmite (equivalent to 6,510 g. of $Al_2O_3$) are mixed dry in a kneader, then impregnated with 250 ml. of a 37.5% cobalt nitrate solution $Co(NO_3)_2$ and 2 liters of a 68% ammonium molybdate solution $(NH_4)_2MoO_4$ and kneaded for half an hour. The kneaded material is then dried at 500° C. for five hours, the ammonium salt thus being decomposed. The dried catalyst powder is finely ground and mixed with water to form a friable material which is extruded into 4 mm. strands in a hydraulic extruder. The strands are dried for four hours at 120° C. and calcined for three hours at 600° C. The catalyst then has the following composition:

| | Percent |
|---|---|
| $Al_2O_3$ | 62.4 |
| MgO | 23.4 |
| $MoO_3$ | 10 |
| CoO | 4 |
| $H_2O$ | 0.2 |

The bulk density is 930 g./liter and the mean crushing strength of the strand is 3.3 kg.

EXAMPLE 2

Experiments (B) and (D) described in Example 1 are stopped after an on-stream period of 1,200 hours in order to remove samples of catalyst. The following results are obtained at the end of this period:

TABLE 2

| | Test | | | |
|---|---|---|---|---|
| | (B) | | (D) | |
| | Reactor No. | | | |
| | 1 | 2 | 1 | 2 |
| Dry gas, vol./vol./hour | 1,500 | 1,500 | 3,000 | 3,000 |
| Wet gas, vol./vol./hour | 3,500 | 3,500 | 6,500 | 6,500 |
| Temperature, ° C.: | | | | |
| At entry | 340 | 340 | 300 | 300 |
| At exit | 460 | 345 | 425 | 305 |
| CO content in dry gas | 6.5 | 1.6 | 5.9 | 1.1 |

The internal surface area of the catalysts used in experiments (B) and (D) is determined by the BET method before use and after use (i.e. after 1,200 hours) and the results are compared.

TABLE 3

| | (B) | (D) |
|---|---|---|
| Surface area of fresh catalyst in m.²/g | 90 | 95 |
| Surface area of catalyst measured after 1,00 hours in m.²/g | 12 | 75 |

The internal surface area of catalyst (B) decreases by 87% whereas the change in internal surface area of catalyst (D) in only about 21%. This also explains why the reaction temperature in experiment (D) has to be raised by only 5° C. between the 400th and 1,200th hour of operation in order to maintain the degree of conversion, whereas in experiment (B) the temperature has to be raised by 20° C.

EXAMPLE 3

A model gas mixture of 10% by volume of carbon monoxide and 90% by volume of nitrogen is converted with an addition of steam at varying temperatures and while admixing a small amount of hydrogen sulfide in continuous experimental equipment operated at atmospheric pressure in which 100 ml. of catalyst is charged into each of four parallel reaction tubes heated in a common aluminum heating block. 100 liters of gas having the said composition together with 25 liters of steam are passed through each of the reaction tubes per hour. Tube (1) contains a commercial iron oxide-chromium oxide conversion catalyst in the form of irregular grains having diameters of from 2 to 4 mm., tube (2) contains a commercial cobalt-molybdenum-alumina catalyst having 4.2% by weight of CoO and 10.0% by weight of $MoO_3$ in the form of 3 mm. pellets, whereas tubes (3) and (4) are each charged with a catalyst according to this invention which is also in the form of 3 mm. pellets. The method of production of these catalysts is described below.

The catalysts are sulfurized in situ for three hours at 400° C. prior to conversion, by passing a gas mixture consisting of 16 liters of $H_2$, 8 liters of $H_2S$ and 5 liters of steam per hour through each reaction tube. 0.1% by volume of $H_2S$ is metered in a subsequent first test period and 0.25% by volume of $H_2S$ in a second test period. In each test period the temperature is successively adjusted to different levels. Determination of the residual carbon monoxide content in the converted gas forty-eight hours after the commencement of each period and forty-eight hours atfer each rise in temperature gives the following results:

TABLE 4

| Test conditions | | CO content in percent by volume oj dry gas leaving tube | | | |
|---|---|---|---|---|---|
| ° C. | $H_2S$ | (1) | (2) | (3) | (4) |
| 250 | 0.1 | 9.7 | 8.3 | 5.4 | 8.2 |
| 300 | 0.1 | 8.4 | 6.9 | 2.5 | 4.2 |
| 350 | 0.1 | 6.0 | 4.7 | 1.0 | 1.5 |
| 400 | 0.1 | 2.6 | 2.4 | 0.8 | 0.9 |
| 250 | 0.25 | 9.6 | 7.5 | 5.0 | 7.3 |
| 300 | 0.25 | 8.1 | 5.3 | 1.4 | 1.3 |
| 350 | 0.25 | 5.0 | 3.5 | 0.6 | 0.5 |
| 400 | 0.25 | 2.1 | 2.0 | 0.7 | 0.6 |

NOTE:
° C.=temperature in ° C.
$H_2S$=volume of $H_3S$ in percent in the jresh gas.

It will be seen from the table that the catalysts according to this invention gives considerably higher carbon monoxide conversions under all conditions than the prior art commercial catalysts. At the highest temperatures, practically thermodynamic equilibrium values are achieved with the catalysts according to this invention.

Production of catalyst (3): 464 g. of boehmite paste containing 23 parts by weight of $Al_2O_3$, and 2,300 g. of magnesium carbonate paste containing 6.45 parts by weight of MgO are concentrated in a steam-heated kneader until appreciable increase in viscosity (consistency) occurs, this being the case after about one hour. Then a solution of 40.6 g. of $Ni(CH_3COO)_2 \cdot 4H_2O$ (equivalent to 12.22 g. of NiO), 37.4 g. of $(NH_4)_6MO_7O_{24} \cdot 4H_2O$ (equivalent to 30.55 g. of $MoO_3$) and 13.25 g. of $Na_2CO_3$ (equivalent to 7.75 g. of $Na_2O$) in 500 ml. of concentrated ammonia solution is allowed to drip into the kneader while it is running, the rate of supply being such that the consistency of the paste remains about the same during addition of the solution; this takes two hours. After all the solution has been added, kneading is continued until the material begins to crumble, this being after about half an hour. The material obtained is dried at 130° C. and then calcined for six hours at 490° C. In order to make the soft powder somewhat grannular, it is moistened and redried. The powder is then molded into 3 mm. pellets with an addition of 3% of stearic acid as pelleting assistant.

Production of catalyst (4): 366.0 g. of boehmite paste containing 23 parts by weight of $Al_2O_3$, and 568.6 g. of magnesium carbonate paste containing 6.45 parts by weight of MgO are concentrated in a steam-heated kneader until an appreciable increase in viscosity (consistency) takes place, this being the case after about ninety minutes. A solution of 39.4 g. of $Co(CH_3COO)_2 \cdot 4H_2O$ (equivalent to 11.86 g. of CoO) and 36.3 g. of $$(NH_4)_6Mo_7O_{24} \cdot 4H_2O$$

(equivalent to 29.65 g. of $MoO_3$) in 500 ml. of concentrated aqueous ammonia solution is dripped into the running kneader at such a rate that the consistency of the paste remains constant, which takes about two hours. After all the solution has been added, kneading is continued until the material begins to crumble, this being after about half an hour. The material obtained is dried at 130° C., then calcined for six hours at 490° C. and the roasted material is forced through a sieve. 11 g. of Secar cement, 3 g. of stearic acid and about 20 g. of water are added to 100 g. of the resultant powder, and the whole is immediately molded into 3 mm. pellets. The pellets are predried for three days in the air and then dried for five hours at 200° C.

We claim:
1. In a process for the catalytic conversion of carbon monoxide with steam into carbon dioxide and hydrogen in the presence of a catalyst containing oxides or sulfides of molybdenum or tungsten together with one or both of the oxides or sulfides of cobalt and nickel, the said oxides or sulfides being combined with a carrier containing aluminum oxide, the improvement which comprises using a catalyst the carrier of which contains one or both of the oxides of magnesium and zinc as well as aluminum oxide, and in which, under the reaction conditions, the catalyst contains 5 to 95% of magnesium-aluminum spinel and/or zinc-aluminum spinel.

2. A process as claimed in claim 1 wherein the catalyst used contains at least 10% of aluminum oxide and at least 5% of magnesium oxide and/or zinc oxide.

3. A process as claimed in claim 1 wherein a catalyst is used which also contains a hydraulic binder.

4. A process as claimed in claim 1 carried out at a temperature of from 180° to 550° C.

5. A process as claimed in claim 1 wherein the catalyst contains under the reaction conditions 15 to 85% of magnesium-aluminum spinel and/or zinc-aluminum spinel.

6. A process as in claim 1 wherein said reaction is carried out at a pressure of 5 to 150 atmospheres.

References Cited

UNITED STATES PATENTS

| | | | |
|---|---|---|---|
| 2,451,041 | 12/1948 | Murphree | 252—465 XR |
| 2,459,480 | 1/1949 | Welty et al. | 252—465 XR |
| 2,474,214 | 6/1949 | Black | 252—465 |
| 2,474,215 | 6/1949 | Kearby | 252—465 |
| 2,992,191 | 7/1961 | Erickson | 252—465 XR |
| 3,061,555 | 10/1962 | McGrew et al. | 252—465 |
| 3,069,250 | 12/1962 | Weittenhiller et al. | 23—213 XR |
| 3,170,758 | 2/1965 | Honerkamp | 23—213 XR |
| 3,355,249 | 11/1967 | Squires | 23—213 |
| 3,388,972 | 6/1968 | Reitmeier | 23—213 |
| 3,392,001 | 7/1968 | Lorenz et al. | 23—213 |
| 3,444,099 | 5/1969 | Taylor et al. | 252—465 |

FOREIGN PATENTS

| | | |
|---|---|---|
| 279,128 | 1/1929 | Great Britain. |
| 420,652 | 12/1934 | Great Britain. |

EDWARD STERN, Primary Examiner

U.S. Cl. X.R.

252—465, 468

PO-1050
(5/69)

UNITED STATES PATENT OFFICE
CERTIFICATE OF CORRECTION

Patent No. 3,529,935        Dated September 22, 1970

Inventor(s) Ernst Lorenz et al

It is certified that error appears in the above-identified patent and that said Letters Patent are hereby corrected as shown below:

Column 4, in Table I, test A, reactor 1, "335" should read -- 345 --.

Column 5, in Table 2, "$^{e}$C." should read -- °C. --.

Column 6, Table 4, "oj" should read -- of --; line 17, "jresh" should read -- fresh --.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents